United States Patent

Dennis

[15] 3,678,219

[45] July 18, 1972

[54] FLYING MAGNETIC HEAD TESTING APPARATUS

[72] Inventor: Willard Dennis, Los Angeles, Calif.

[73] Assignee: Willard Laboratories, Inc., Los Angeles, Calif.

[22] Filed: Sept. 25, 1970

[21] Appl. No.: 75,539

[52] U.S. Cl...........179/100.2 CA, 179/100.2 P, 340/174.1 E

[51] Int. Cl...........G11b 5/46, G11b 5/60

[58] Field of Search..........179/100.2 R, 100.2 P, 100.2 C, 179/100.2 CA; 340/174.1 E

[56] References Cited

UNITED STATES PATENTS

| | | | |
|---|---|---|---|
| 3,537,083 | 10/1970 | Voth | 340/174.1 E |
| 3,401,383 | 9/1968 | Ault | 179/100.2 P |
| 3,290,666 | 12/1966 | Crew | 179/100.2 CA |
| 3,200,385 | 8/1965 | Welsh | 179/100.2 P |

*Primary Examiner*—Howard W. Britton
*Assistant Examiner*—Jay P. Lucas
*Attorney*—Spensley, Horn and Lubitz

[57] ABSTRACT

An apparatus to test the flying capability of flying magnetic heads employed by rotating, magnetic memory systems. A rotatable chuck is coupled to a vacuum system, the top surface of the chuck having apertures therein to make contact with and secure thereto a testing disk via the vacuum system. Magnetic heads aerodynamically designed to be employed over a rotating disk or drum are suspended over the surface of the testing disk. A touch detector is connected between the magnetic head and the testing disk to determine whether or not the flying magnetic head is within the designed aerodynamic specifications to operate with a given disk runout or rate of change of runout.

30 Claims, 6 Drawing Figures

DENNIS WILLARD
INVENTOR

BY Spensley, Horn & Lubitz
ATTORNEYS

DENNIS WILLARD
INVENTOR

BY Spensley, Horn & Lubitz
ATTORNEYS

DENNIS WILLARD
INVENTOR

BY [signature]
ATTORNEYS

FLYING MAGNETIC HEAD TESTING APPARATUS

BACKGROUND OF THE INVENTION

1. Field of the Invention

The present invention is generally related to testing or check-out systems, and is more specifically related to those systems adapted to test the operating characteristics of flying magnetic heads.

2. Prior Art

With the substantial increase in the use of digital computer systems, it is evident that better manufacturing and quality control equipment is needed to insure maximum efficiency in the production of such digital computer systems and their associated peripheral equipment. The digital computer systems being designed, built and installed in today's market often use as internal and/or auxiliary memory systems comprising magnetic disk files or magnetic drums. In order for a magnetic disk file or drum to operate in a manner which will permit reliable storage and read-out of data, the magnetic heads used therewith must at all times operate within the design specifications.

The characteristics of flying magnetic heads permit them to hover above the surface of the magnetic disk in a manner which will permit accurate reading and writing of stored data. Since typical magnetic disks used for the storage of data have undulations along the surface thereof, the flying magnetic head must be capable of adjusting to the degraded surface conditions. The undulations in the surface of the disk are referred to in the art as runout. In addition to the runout of the disk, the finish of the disk, the force upon the flying magnetic head (unit load), rate of runout of the disk, surface velocity of the disk and the rate of change of the unit load will affect the capability of the magnetic head to fly within the established limitations. In the event that a flying magnetic head will not meet the design specifications, the flying magnetic head may contact the surface of the disk thereby causing serious and often irreparable damage to the disk. Since any contact of the magnetic disk head with the disk surface can cause loss of stored data and damage to the disk, the occurrence of even a single event must be precluded if a satisfactory data processing system is to be produced.

Even though magnetic disk files have been used for many years, the flying ability of the flying magnetic heads have typically been tested merely by the physical measurement of the dimensional characteristics of the head itself. In this manner, the main variables which can affect the operability of the flying head have been totally disregarded. The present invention flying head testing apparatus provides means to dynamically test the flying ability of a flying magnetic head under conditions which closely approximate actual operation of the head or under worst case conditions to insure a proper safty factor. In addition, the variables can be controlled within tight limitations thereby providing more flexibility in design criteria.

The present invention flying head testing apparatus solves those problems left substantially unresolved by the prior art. A testing disk having a chrome or other hard surface is disposed upon a vacuum chuck. The vacuum chuck secures the testing disk to the top surface thereof in a manner which permits it to be rotated at the high rate of speed required for accurate simulation of disk file operation. The flying magnetic heads under test are lowered toward the surface of the testing disk and subjected to variations in the design limitations. Disk runout capability can be tested by the insertion of precision, calibrated shims between the testing disk and the surface of the vacuum chuck. In addition, the proper insertion of the shims can be made to simulate worst-case design limitations of rate of change of disk runout. A touch detector is in electrical contact with the testing disk and the magnetic head and, therefore, if any part of the flying magnetic head contacts the surface of the testing disk, the event will be recorded thereby identifying a failure of the flying magnetic head to operate within the design specifications.

SUMMARY OF THE INVENTION

It is an object of the present invention to provide an apparatus to test the aerodynamics of flying magnetic heads.

It is another object of the present invention to provide an apparatus which can simulate the physical characteristics of magnetic disks and the operation of flying magnetic heads under such conditions.

It is still another object of the present invention to test the flying ability of flying magnetic heads under dynamic conditions.

It is still yet another object of the present invention to provide a device which can test multiple arrays of flying magnetic heads.

In order to test the flying magnetic heads under dynamic conditions, a testing disk is mounted upon a vacuum chuck. Apertures are disposed from the top surface of a vacuum chuck to cavities within the undersurface of the vacuum chuck. The apertures couple a vacuum system to the surface of the vacuum chuck thereby providing for a securing force when a testing disk is disposed upon the top surface of the vacuum chuck. The vacuum chuck is mounted upon and secured to a spindle which is mounted within a precision ball-bearing mounting. The spindle acts as a drive shaft as well as a coupling from the vacuum system to the vacuum chuck. The vacuum system is mounted at the base of the spindle and coupled through a standard, rotatable vacuum connection to the spindle. A drive belt which is driven by a speed control motor rotates the spindle and the vacuum chuck assembly, the assembly being rotated at a predetermined speed consistent with the test conditions.

Calibrated shims mounted upon the radial land areas on the top surface of the vacuum chuck permit the introduction of actual, controlled runout in the disk and rate of change of runout as required by the testing conditions. The design of the flying magnetic head will establish certain flying criteria for the magnetic heads, the criteria being tested by the introduction of the shims.

After the testing disk has been properly adjusted to provide for the test conditions, one or more of the magnetic heads under test are secured within head testing fixtures and lowered into a flying position above the surface of the testing disk. A touch or other suitable type detector is coupled between the flying magnetic head being tested and the testing disk to determine whether or not any part of the flying magnetic head touches the surface of the testing disk. If such an event occurs, the flying magnetic head has failed to operate within the design characteristics.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
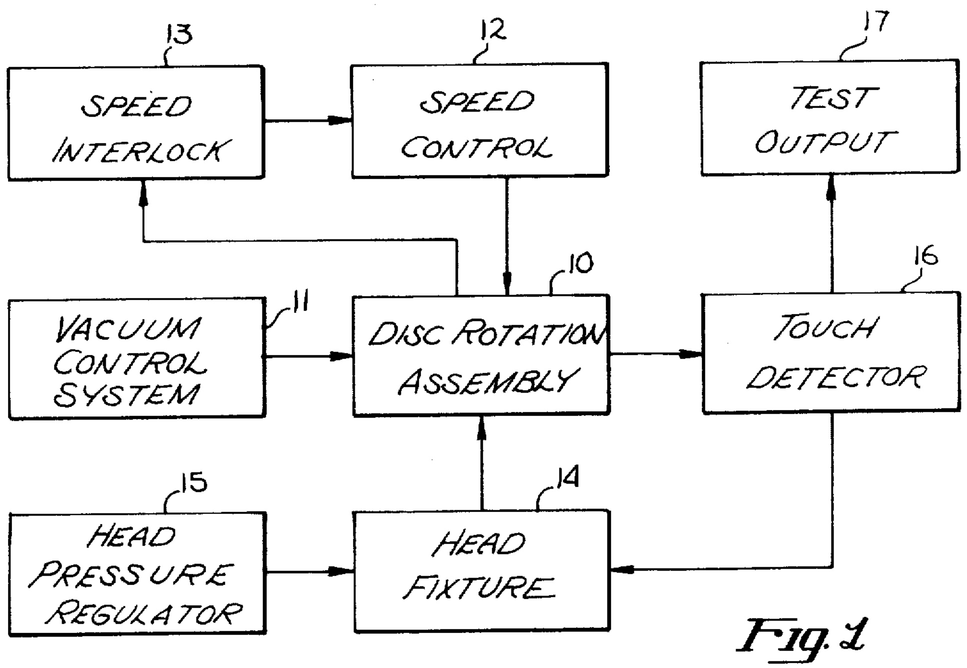
FIG. 1 is a schematic diagram, in block form, of an embodiment of the present invention testing apparatus.

An understanding of the present invention flying magnetic head testing apparatus can be best gained by reference to FIG. 1 wherein a schematic diagram, in block form, of an embodiment of the present invention is shown therein. A testing disk is initially mounted upon disk rotation assembly 10. Disk rotation assembly 10 comprises both the means to secure the testing disk as well as means for rotating the testing disk. Disk rotation assembly 10 is coupled to vacuum control system 11. Vacuum control system 11 provides the force for securing the testing disk to disk rotation assembly 10.

The surface velocity of the testing disk must be maintained at an accurate level in order to provide adequate simulation of the typical operating conditions of a disk file. In typical operations, the disk rotation assembly 10 will rotate the testing disk at a speed within the range of 500 – 2,000 surface inches per second. In order to maintain the accurate level of surface velocity, speed control 12 is coupled to disk rotation assembly 10, speed control 12 being a conventional device. Since an accurate test of the flying magnetic heads cannot be carried out until the testing disk has reached the selected speed, speed interlock 13 monitors the velocity of the testing disk and prevents operation of the flying magnetic heads until the disk has reached the selected speed. When the selected speed has been reached, speed interlock 13 permits the flying magnetic heads to be lowered into flying position.

The flying magnetic heads under test are secured within head fixtures 14. Head fixtures 14 comprise a number of individual fixtures which are suitable to hold the flying magnetic heads and will permit the application of the desired unit load on the heads. The heads being tested can be either moveable or fixed types, the later typically requiring closer tolerances thereby necessitating procedures such as carried out with the present invention. Head pressure regulator 15 determines the unit load to be placed upon the flying magnetic heads under test, head pressure regulator 15 being a conventional device and being coupled to head fixtures 14 for the application of the appropriate unit load.

Since an object of the present invention flying magnetic head testing apparatus is to determine whether or not the heads under test will fly within the predetermined aerodynamic limits, the test is a go/no-go decision. If a flying magnetic head touches the surface of the testing disk, the head under test will have failed to operate within the predetermined limits. Touch detector 16 is coupled between disk rotation assembly 10 and head fixtures 14 to determine whether or not the flying magnetic heads under test have made contact with the surface of the testing disk. Where any part of the flying magnetic heads under test have made contact with the surface of the testing disk, touch detector 16 will present the appropriate indication at test output 17 to indicate the failure of the flying magnetic head being tested. Although touch detector 16 is preferable for implementing the present invention apparatus, the test could utilize a detector which determines when the head is in close proximity to the testing disk, such as a capacitance probe or an eddy current detector.

Figure 2:
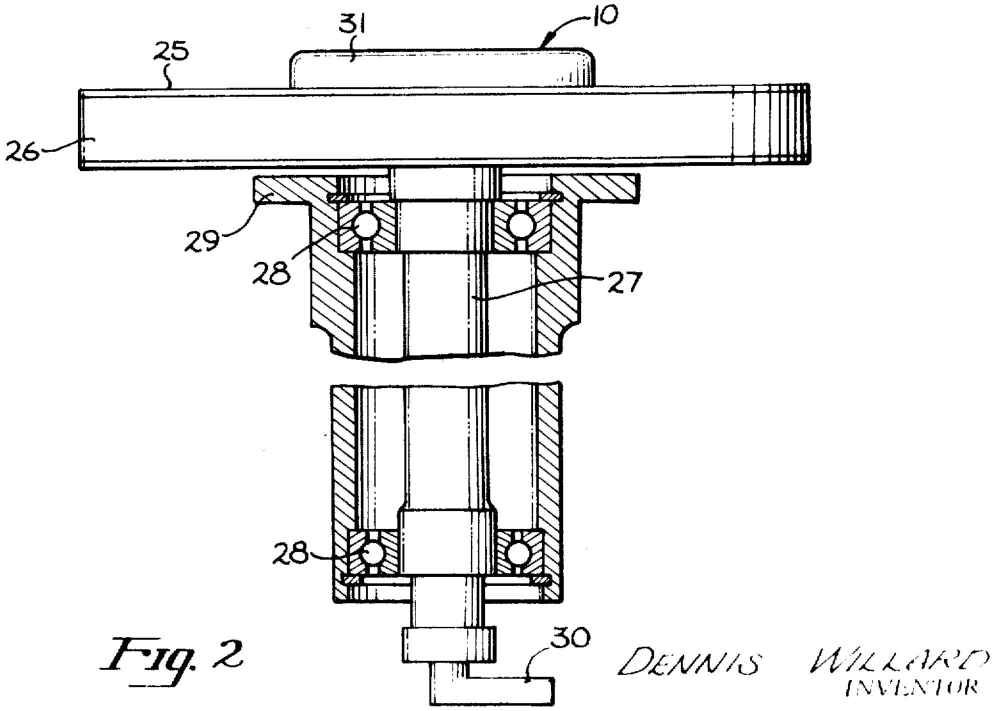
FIG. 2 is a side elevation view, in partial cross-section, of a mounted vacuum chuck and disk spindle in accordance with the present invention.

The element of disk rotation assembly 10 can be best seen by reference to FIG. 2 wherein a mounted testing disk 25 is shown mounted on disk rotation assembly 10 shown in partial cross-section. Disk rotation assembly 10 comprises vacuum chuck 26 secured to and mounted upon spindle 27. Spindle 27 is held by pre-loaded precision bearings 28 mounted between spindle 27 and stable reference 29, stable reference 19 typically being a heavy frame. Spindle 27 is both a drive shaft and vacuum line for vacuum chuck 26, and therefore the lower portion of spindle 27 is joined to vacuum connection 30, the coupling being a conventional, rotatable vacuum coupling. Vacuum connection 30 permits free rotation of spindle 27 while simultaneously providing a coupling to vacuum control system 11, (FIG. 1)

Figure 3:
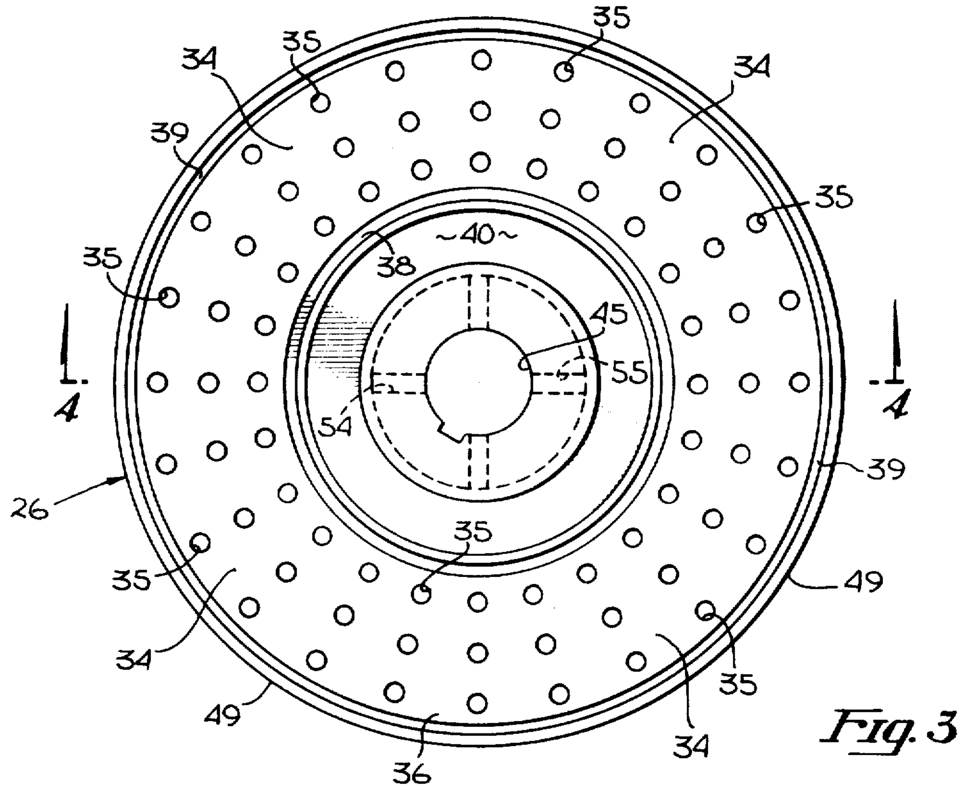
FIG. 3 is a top plan view of a vacuum chuck in accordance with the present invention.

As can be seen in FIG. 2, testing disk 25 is disposed upon the top surface of vacuum chuck 26 and centered about hub 31. The top surface of vacuum chuck 26 can be best seen by reference to FIG. 3 wherein a top plan view of vacuum chuck 26 is shown therein. The view of vacuum chuck 26 shown in FIG. 3 omits hub 31 permitting a more detailed view of the structure thereof. Vacuum chuck 26 is substantially cylindrical member having a diameter which is suitable for the specific disks 25 being used, the diameter of vacuum chuck 26 typically being approximately 14 inches. The axial length of vacuum chuck 26 must be sufficient to prevent deformation of vacuum chuck 26 when high speeds of rotation are achieved, therefore, a suitable axial length for vacuum chuck 26 is approximately 1 1/2 inches. Vacuum chuck 26 can be fabricated of conventional metals suitable to withstand the forces involved, such as steel, the particular material used to fabricate vacuum chuck not being part of the present invention. Apertures 35 are disposed from the top to the bottom surface of vacuum chuck 26 to expose the bottom surface of testing disk 25 to the effect of the vacuum created by vacuum control system 11. The undersurface of vacuum chuck 26 will be explained in detail hereinbelow. Apertures 35 are spaced at substantially uniform angular intervals along surface 35 of vacuum chuck 26. The angular intervals must be suitable to insure that a sufficient vacuum will be created to fully secure testing disk 25 to surface 36 of vacuum chuck 26, a suitable angular interval typically being 15°. At each radial position where apertures 35 appear, a number of apertures 35 are extended along the specific radial position. The vacuum chuck 26 shown in FIGS. 3 and 4 has three apertures 35 at each angular position, but the number to be used can be adjusted to the specific requirements which arise. The use of three apertures per angular position is for illustration and description only. Land areas 34 disposed intermediate apertures 35 provide a base for the placement of means to simulate disk runout and rate of change of runout, the simulating means and manner of placement to be discussed in detail hereinbelow.

To insure that a proper vacuum seal is created between the bottom surface of testing disk 25 and surface 36 of vacuum chuck 26, channels 38 and 39 are circumferentially disposed in surface 36 of vacuum chuck 26, channels 38 and 39 being concentric about the axis of vacuum chuck 26. Cannel 39 is disposed near the outer perimeter of vacuum chuck 26, channel 39 circumscribing all apertures 35. Channel 39 is concentrically within channel 39, channel 39 bounding the interior limits of all apertures 35. The depth of channels 38 and 39 is sufficient to have conventional O-rings disposed therein, the 0-rings insuring the maintenance of sufficient vacuum to secure testing disk 25 to surface 36 of vacuum chuck 26. Concentrically disposed within channels 38 and 39 and circumscribed by channel 39 is channel 40. Channel 40 provides mounting means for hub 31, the depth of channel 40 being sufficient to mount hub 31 therein. The interface between channel 40 and hub 31 is described in detail hereinbelow.

Figure 4:
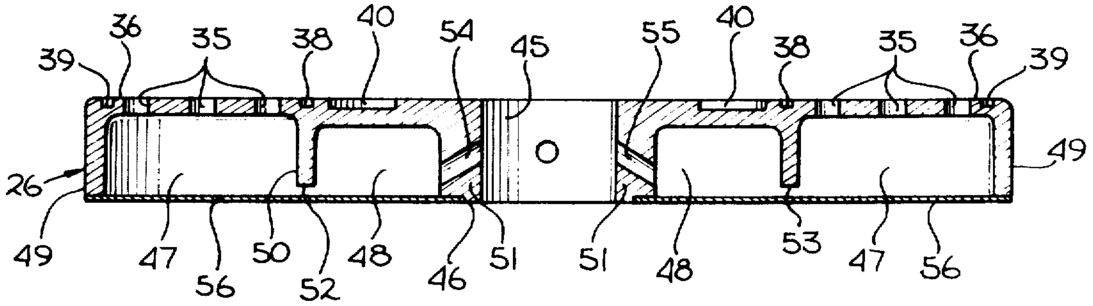
FIG. 4 is a cross-sectional view of the vacuum chuck taken along line 4—4 of FIG. 3.

The manner in which testing disk 25 is secured to surface 36 of vacuum chuck 26 can be best seen by reference to FIG. 4 wherein a cross-sectional view of vacuum chuck 26 is shown therein. Axial portion 45 of vacuum chuck 26 provides mounting means for vacuum chuck 26 as well as provides means for coupling vacuum control system 11 to testing disk 25. The undersurface 46 of vacuum chuck 26 has concentric cavities 47 and 48 disposed therein, concentric cavities 47 and 48 being substantially toroidal in shape with cavity 48 circumscribed by cavity 47. Cavity 47 is bounded on its outer periphery by outer wall 49 of vacuum chuck 26, cavities 47 and 48 being separated by intermediate wall 50. Cavity 48 circumscribes axial portion 45 and is separated therefrom by interior wall 51. Concentric cavities 47 and 48 may be disposed in undersurface 46 of vacuum chuck 26 by conventional means such as mechanical or chemical milling, the manner of disposing cavities 47 and 48 not being part of the present invention. The depth of concentric cavities 47 and 48 is suitable to provide a vacuum path from axial portion 45 to apertures 35 without weakening the structural strength of vacuum chuck 26, the depth of concentric cavity 47 and 48 typically being 1 ¼ inches. Apertures 35 are disposed through vacuum chuck 26 from surface 36 to cavity 47, all of apertures 35 being disposed between outer and intermediate walls 49 and 50. To provide an air conduction path between cavities 47 and 48, openings 52 and 53 are formed in wall 50 thereby linking the two toroidal cavities 47 and 48. To connect axial portion 45 with cavity 48, channel apertures 54 and 55 are disposed through interior wall 51. Cover plate 56 is mounted upon undersurface 46 enclosing and sealing concentric cavities 47 and 48.

The present invention testing apparatus is to simulate worst case conditions for disk runout and rate of change of runout to insure that the flying magnetic heads will operate under those conditions, therefore, surface 36 and the mounting of disk rotation assembly 10 cannot be such as to inject substantial inherent errors due to structural deficiencies. For some cases, vacuum chuck 26 is surfaced on its bearings 28 in such a manner that the runout from a horizontal plane will be less than 0.0002 inches along a circumferential path about vacuum chuck 26. In addition, surface 36 and mounting members to insure that radial runouts of vacuum chuck 26 in some cases should not exceed ±0.001 inches. Referring back to FIG. 2, the placement of bearings between spindle 27 and stable reference 29 must be such to reduce to a minimum the cantilever action which would occur if the distance between bearings 28 was insufficient. The cantilever action would occur as a result of the overhang of the outer portions of vacuum chuck 26 if the distance between bearings 28 was not sufficient. To insure minimum cantilever action, bearings 28 may be mounted approximately 12 inches apart.

Figure 5:
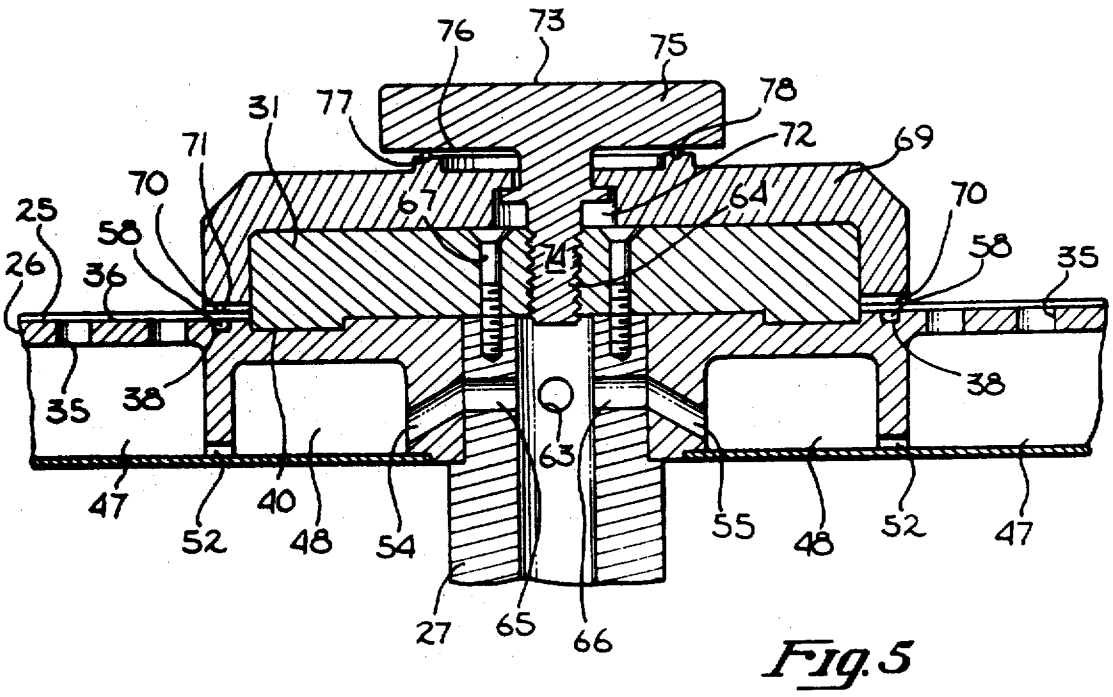
FIG. 5 is an interlock cap for securing a testing disk used in accordance with the present invention.

A typical method by which testing disk 25 is secured to vacuum chuck 26 can be best seen by reference to FIG. 5 wherein a sectional view of a mounted testing disk 25 can be best seen. Vacuum chuck 26 is disposed about the upper portion of spindle 27, channel apertures 54 and 55 being aligned with spindle apertures 65 and 66 respectively. Spindle aperture 63 is shown directed to another portion of vacuum chuck 26. Hub 31 is disposed upon hub channel 40 and secured to spindle 27 by conventional bolts 67. Testing disk 25 is placed upon surface 36 of vacuum chuck 26 circumscribing hub 31 and being substantially adjacent thereto, the inner portion of testing disk 25 being seated upon 0-ring 58 disposed within 0-ring channel 38. The bottom surface of testing disk 25 is adjacent to vacuum apertures 35. Since testing disk 25 will be rotated at speeds of 3,200 revolutions per minute or more, there must be assurance that testing disk 25 will not become inadvertently dislodged from the present invention testing apparatus. To insure that testing disk 25 will not be dislodged, securing cap 69 is employed. Flat 0-ring 70 is placed upon the upper inner portion of testing disk 25 substantially adjacent the periphery of hub 31. Securing cap 69 is substantially circular in shape, having a bottom surface which is aligned with the outer surface of hub 31. The peripheral lower portion 71 of securing cap 69 is a flat plane adapted to be received by flat 0-ring 70, the inner portion thereof abutting the top surface of hub 31. Opening 72 is disposed from the top to the bottom surface of securing cap 69, opening 72 being substantially aligned with the opening at the center of hub 31. Locking member 73 is disposed within opening 72. Locking member 73 comprises a lower threaded portion 74 and an upper sealing portion 75. Hub opening 64 is threaded and adapted to receive threaded portion 74 of locking member 73. Sealing member 75 extends radially outward from opening 72 and has a bottom surface 76 adapted to make a vacuum seal. 0-ring channel 77 extends outwardly from the top surface of the inner portion of securing cap 69 concentrically inward from the periphery of surface 76 of sealing portion 75. 0-ring 78 is disposed within 0-ring channel 77 and adapted to receive surface 76 of sealing portion 75 thereby creating a vacuum seal when locking member 73 is disposed within threaded opening 64 of hub 31 and tightened to form a tight interface between 0-ring 78 and surface 76.

Securing cap 69 could be secured by providing receiving threads at the portion of spindle 27 whereby threaded member 74 would be received thereby. Where this form of sealing is employed, bolts 67 may be dispensed with.

After testing disk 25 is disposed upon vacuum chuck 36 and flat 0-ring 70 is placed upon the upper inner portion of testing disk 25 and securing cap 69 placed upon flat 0-ring 70 and tightened, vacuum control system 11 as shown in FIG. 1 can be activated. Spindle 27, in addition to acting as a drive shaft for vacuum chuck 26, also provides a coupling between vacuum chuck 26 and vacuum control system 11. Air is evacuated from cavities 47 and 48 through channel apertures 54 and 55 and spindle apertures 63, 65 and 66. By evacuating the air in cavities 47 and 48, the atmospheric force upon the top surface of testing disk 25 will insure that the disk 25 does not become inadvertently dislodged after the disk is set in rotation. Securing cap 69 and locking member 73 act as an interlock for vacuum control system 11. Vacuum control system 11 as shown in FIG. 1 includes an interlock switch which will prevent rotation of vacuum chuck 26 until the vacuum can be adjusted down to approximately 10 pounds per square inch. 0-rings 58, 70 and 78 are placed at locations which offer potential air condition paths and, therefore, constitute areas which can degrade the vacuum created. Unless locking member 73 is tightened, the air pressure will not be low enough to permit the interlock switch to allow disk rotation. Once locking member 73 is tightened, a vacuum seal will be formed at the 0-rings 58, 70 and 78 permitting the pressure in the system to be lowered to a suitable level thereby allowing the vacuum chuck 26 to be rotated.

Figure 6:
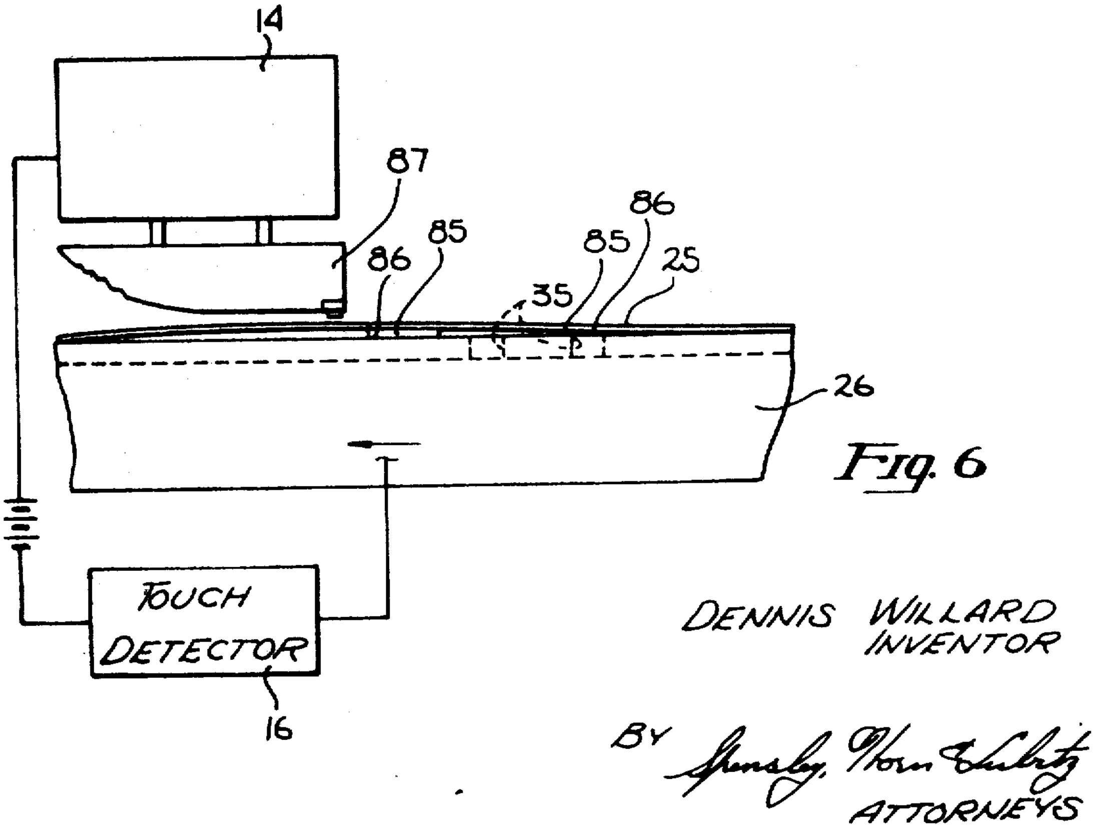
FIG. 6 illustrates testing of a flying magnetic head in accordance with the present invention.

An understanding of the testing of a flying magnetic head by the present invention testing apparatus can be best seen by reference to FIG. 6 wherein a partial cross-section of testing disk 25 simulating given runout conditions is shown. An object of the present invention testing apparatus is to permit simulation of disk runout and rate of change of runout conditions which can occur in actual operation of magnetic disk systems. Calibrated shims 85 are placed upon land areas 86 between apertures 35 on surface 36 of vacuum chuck 26. After testing disk 25 is disposed thereon, runout conditions are simulated by the undulations formed in the surface of testing disk 25, the undulations being created by the deformation imposed on testing disk 25 by calibrated shims 85. In addition, the rate of change of runout is also simulated and controlled by the placement of shims 85. The adjustment of runout characteristics on testing disk 25 can be up to and including 0.008 inches with a maximum rate of change of runout equal to approximately one-half this amount every 45° around the circumference of testing disk 25. Head fixture 14 secures flying magnetic head 87 above the surface of testing disk 25. Touch detector 16 is coupled to head fixture 14 and vacuum chuck 26 to detect if any portion of flying magnetic head 87 touches the surface of testing disk 25, an exemplary manner being a check of electrical continuity therebetween. A typical way of detecting the event is schematically depicted in FIG. 6 wherein a battery is placed between head fixture 14 and touch detector 16, head fixture 14 providing continuity between one side of the battery and a metal portion of flying magnetic head 87. If a metal portion of flying magnetic head 87 touches the surface of testing disk 25, a signal will be received which can be used to activate an appropriate indicator in touch detector 16. One form of implementing the test output indicator is through the use of conventional digital logic such as a flip-flop or a one-shot multivibrator which is in turn connected to a light or other appropriate indicator. In the event that flying magnetic head 87 does not have a metal portion which would contact the surface of testing disk 25, a sonic detector could be used to detect the audible sound which occurs when contact or near contact is made between flying magnetic head 87 and the surface of testing disk 25. Although testing disk 25 as described in the discussion hereinabove is preferably a chrome plated disk capable of withstanding contact by the flying magnetic heads being tested, the disk used for testing purposes could be a conventional data-bearing disk. Where a data-bearing disk is used, the electrical characteristics of the magnetic head could also be tested thereby providing an integrated system which tests both the aerodynamic and electrical characteristics of a magnetic head.

Although the preferred means to detect contact between the magnetic head and testing disk 25 are as set forth hereinabove, it is understood that other types of suitable detection units could be used to sense flying heights rather than physical contact such as capacitance probes and eddy current detectors. To utilize capacitance probe, a probe is embedded in the magnetic head being tested, the probe acting as one plate of a capacitor. Testing disk 25 acts as the other plate of the capacitor. Using a conventional AC bridge technique, and with proper detection of an imbalance of the bridge, a voltage can be generated which is a function of the interval between the head mounted probe and the surface of testing disk 25. To implement an eddy current probe, an inductor is embedded within the magnetic head being tested. Where testing disk 25 has a conductive surface, an AC stimulus results in the generation of an eddy current in testing disk 25. The amplitude of the eddy current is a function of the interval between the magnetic head under test and the surface of testing disk 25. Measurement of the eddy current permits detection of the flying height of the magnetic head.

The present invention flying magnetic head testing apparatus provides means to accurately test the flying characteristics of a magnetic head under test conditions. Instead of placing reliance upon mere physical dimensions, the conditions which can affect head operability can be simulated with the resulting test establishing conclusively the operability or nonoperability of the tested heads.

I claim:

1. An apparatus to test magnetic heads comprising:
  a. a testing disk having a metallic surface being generally unsuitable for normal recording;
  b. disk rotation means for rotating and securing thereto said testing disk;
  c. means disposed intermediate said testing disk and said disk rotation means for imposing test conditions;
  d. a head fixture in fixed relationship with said disk rotation means coupling the magnetic head being tested in cooperative relationship with said testing disk; and
  e. detection means for detecting contact between the magnetic head being tested and said testing disk.

2. An apparatus as in claim 1 wherein said disk rotation means includes vacuum means for securing the testing disk thereto.

3. An apparatus as in claim 1 wherein said detection means is coupled to said testing disk and the magnetic head being tested to detect electrical continuity therebetween.

4. An apparatus as in claim 1 wherein said detection means is a sonic detector whereby the audible indicia of proximity between said testing disk and the magnetic head is detected.

5. An apparatus to test the aerodynamic characteristics of flying magnetic heads comprising:
  a. a testing disk having top and bottom metallic surfaces being generally unsuitable for normal recording;
  b. disk rotation and securing means for rotating said testing disk at a predetermined speed and having a rotating horizontal portion adapted to secure the bottom surface of said testing disk thereto;
  c. controlling means for controlling test conditions disposed intermediate the bottom surface of said testing disk and predetermined areas of the rotating horizontal portion;
  d. one or more head fixtures in fixed relation with said rotating horizontal portion coupled to magnetic heads being tested and placing same in given positions relative to the top surface of said testing disk; and
  e. detection means for detecting a cooperative relationship between the magnetic heads being tested and the top surface of said testing disk.

6. An apparatus as in claim 5 wherein said controlling means are calibrated shims.

7. An apparatus as in claim 5 wherein said detection means is coupled to said testing disk and the flying magnetic head to detect physical contact therebetween.

8. An apparatus as in claim 5 wherein said detection means is a sonic detector whereby the audible indicia of contact between said testing disk and the flying magnetic head is detected.

9. An apparatus as in claim 5 wherein said disk rotation and securing means comprises:
  a. power means for providing rotation power;
  b. rotatable vacuum means for securing the bottom surface of the testing disk thereto;
  c. a vacuum source; and
  d. means for coupling said power means and said vacuum source to said rotatable vacuum means.

10. An apparatus as in claim 9 wherein said rotatable vacuum means includes a substantially cylindrical chuck having top, bottom and peripheral surfaces and first and second concentric cavities disposed intermediate the top and bottom surfaces, an axial opening being disposed from the top to the bottom surfaces, a plurality of vacuum apertures being disposed from the top surface to one of said cavities, said cavities being connected to each other and to said axial opening by predetermined openings, and the top surface having concentric channels disposed therein defining the area of said plurality of apertures therebetween.

11. An apparatus as in claim 10 wherein said rotatable vacuum means also includes O-rings coupled to said chuck within said concentric channels adapting said chuck to form a vacuum seal with the bottom surface of said testing disk.

12. An apparatus as in claim 10 wherein said simulation means are coupled to the top surface of said chuck intermediate said vacuum apertures.

13. An apparatus as in claim 10 wherein said plurality of vacuum apertures are aligned at uniform angular intervals about said cylindrical chuck.

14. An apparatus as in claim 13 wherein said uniform angular interval is 15°.

15. A testing apparatus for flying magnetic heads comprising:
  a. a testing disk having top and bottom metallic, surfaces unsuitable for normal recording;
  b. a vacuum chuck having top and bottom surfaces and inner, intermediate and outer concentric walls extending substantially perpendicular from said bottom surface, the inner and intermediate walls and the intermediate and outer walls respectively defining cavities therebetween, the inner wall defining an axial opening through said vacuum chuck, said intermediate and inner walls respectively having predetermined openings disposed therein, vacuum apertures being disposed in said vacuum chuck from the top surface to a cavity defining given land areas and the top surface having disposed therein concentric channels having means to receive the bottom surface of said testing disk;
  c. vacuum means for evacuating the air in said vacuum chuck;
  d. spindle means coupled to the axial opening in said vacuum chuck for rotating said vacuum chuck and coupling said vacuum chuck to said vacuum means;
  e. securing means for securing said disk to said vacuum chuck;
  f. simulation means for simulating test conditions disposed intermediate the bottom surface of said testing disk and said land areas defined by said vacuum apertures;
  g. rotation means for rotating said testing disk at a predetermined speed coupled to said spindle means;
  h. one or more head fixtures in fixed relation with the top surface of said vacuum chuck coupled to flying magnetic heads being tested and placing same in a given position relative to the top surface of said testing disk; and
  i. detection means for detecting a cooperative relationship between the flying magnetic heads being tested and the top surface of said testing disk.

16. An apparatus as in claim 15 wherein 0-rings are disposed in said concentric channels adapting said vacuum chuck to form a vacuum seal with the bottom surface of said testing disk.

17. An apparatus as in claim 15 wherein said simulation means are calibrated shims.

18. An apparatus as in claim 15 wherein said detection means is coupled to said testing disk and the flying magnetic heads being tested to detect physical contact therebetween.

19. An apparatus as in claim 15 wherein said detection means is a sonic detector whereby the audible indicia of contact between said testing disk and the flying magnetic heads being tested is detected.

20. An apparatus as in claim 15 wherein said securing means comprises:

a. a substantially circular hub disposed upon the top surface of said vacuum chuck and secured to said spindle means, said hub adapted to have said testing disk disposed about same, said hub having a threaded opening axially disposed therein;

b. sealing means disposed upon the top surface of said disk substantially adjacent said hub for providing a vacuum seal;

c. a securing cap disposed upon said hub having a portion contacting said sealing means and an axial opening formed therein substantially aligned with the threaded opening of said hub;

d. a locking member having a first and second portion, said first portion inserted through the axial opening in said securing cap and having an end adapted to be received by said threaded opening, said second portion being radially extended from the end of said portion extending from said securing tap; and e. means for forming an air-tight seal between the second portion of said locking member and said securing cap whereby said testing disk is secured to said vacuum chuck permitting same to be rotated.

21. An apparatus as in claim 20 wherein the air-tight seal formed by said securing means interlocks said rotation means whereby said vacuum chuck will not be rotated in the absense of an air-tight seal.

22. An apparatus as in claim 15 wherein said vacuum apertures are disposed in said vacuum chuck at uniform, angular intervals.

23. An apparatus as in claim 22 wherein said uniform, angular intervals are 15°.

24. An apparatus as in claim 22 wherein said vacuum apertures are disposed in said vacuum chuck from the top surface thereof to the cavity defined by said outer and intermediate walls.

25. A testing apparatus to test flying magnetic heads comprising:

(a) a testing disk having top and bottom metallic surfaces unsuitable for normal recording;

(b) a vacuum chuck having top and bottom surfaces and inner, intermediate and outer concentric walls extending substantially perpendicular from said bottom surface, the inner and intermediate walls and the intermediate and outer walls respectively defining cavities therebetween, the inner wall defining an axial opening through said vacuum chuck, said intermediate and inner walls respectively having predetermined openings disposed therein, a plurality of vacuum apertures disposed in said vacuum chuck from the top surface to the cavity defined by said outer and intermediate walls at uniform intervals defining given land areas therebetween the top surface having disposed therein concentric channels adapted to receive the bottom surface of said testing disk;

c. vacuum means for evacuating the air in said vacuum chuck;

d. a spindle being substantially cylindrical being coupled at one end thereof to the axial opening in said vacuum chuck, the other end thereof being coupled to said vacuum means;

e. rotation means for rotating said testing disk coupled to said spindle;

f. controlling means for controlling test conditions disposed intermediate the bottom surface of said testing disk and said land areas defined by said vacuum apertures;

g. securing means for securing said disk to the top surface of said vacuum chuck;

h. one or more head fixtures in fixed relation with the top surface of said vacuum chuck coupled to the flying magnetic heads being tested and placing same in a given position relative to the top surface of said testing disk; and i. detection means for detecting a cooperative relationship between the flying magnetic heads being tested and the top surface of said testing disk.

26. An apparatus as in claim 25 wherein said uniform angular interval is 15°.

27. An apparatus as in claim 25 wherein said detection means is coupled to said testing disk and to a portion of said flying magnetic heads being tested to detect physical contact therebetween.

28. An apparatus as in claim 25 wherein said detection means is a sonic detector whereby the audible indicia of contact between said testing disk and the flying magnetic heads being tested is detected.

29. An apparatus as in claim 25 wherein said securing means comprises:

a. a substantially circular hub disposed upon the top surface of said vacuum chuck and secured to said spindle, said hub adapted to have said testing disk disposed about same, said hub having a threaded opening axially disposed therein;

b. sealing means disposed upon the top surface of said disk substantially adjacent said hub for providing a vacuum seal;

c. a securing cap disposed upon said hub having a portion contacting said sealing means and an axial opening formed therein substantially aligned with the threaded opening of said hub;

d. a locking member having a first and second portion, said first portion inserted through the axial opening in said securing cap and having an end adapted to be received by said threaded opening, said second portion being radially extended from the end of said first portion extending from said securing cap; and e. means for providing an air-tight seal between the second portion of said locking member and said securing cap.

30. An apparatus as in claim 29 wherein said rotation means is interlocked with said vacuum means whereby said vacuum chuck is rotated when an air-tight seal is formed by said securing means.

* * * * *